United States Patent
Hager et al.

(10) Patent No.: US 6,753,806 B1
(45) Date of Patent: Jun. 22, 2004

(54) METHODS AND APPARATUS TO COMPENSATE FOR ZERO DOPPLER RETURNS

(75) Inventors: James R. Hager, Golden Valley, MN (US); Benjamin J. Winstead, Roseville, MN (US); Lavell Jordan, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/459,138

(22) Filed: Jun. 11, 2003

(51) Int. Cl.[7] .............................. G01S 7/40; G01S 13/08
(52) U.S. Cl. ....................... 342/169; 342/170; 342/171; 342/120; 342/122
(58) Field of Search ................................ 342/165, 169, 342/170, 171, 172, 173, 174, 120, 121, 122

(56) References Cited

U.S. PATENT DOCUMENTS

| | | | |
|---|---|---|---|
| 4,594,676 A | | 6/1986 | Breiholz et al. |
| 4,683,473 A | * | 7/1987 | Haugland .................... 342/172 |
| 4,806,935 A | * | 2/1989 | Fosket et al. ................ 342/120 |
| 5,736,957 A | | 4/1998 | Raney |
| 6,025,800 A | | 2/2000 | Hager et al. |
| 6,114,984 A | | 9/2000 | McNiff |
| 6,362,776 B1 | | 3/2002 | Hager et al. |
| 2003/0210180 A1 | * | 11/2003 | Hager et al. ................. 342/165 |
| 2003/0210181 A1 | * | 11/2003 | Hager et al. ................. 342/165 |

OTHER PUBLICATIONS

"Radar altimeter gate tracking: theory and extension", Jensen, J.R.;Geoscience and Remote Sensing, IEEE Transactions on, vol.: 37, Issue: 2, Mar. 1999, pp. 651–658.*

"Design and simulation of an interferometric Doppler radar altimeter", Sorge, S.; Zelli, C.; Picardi, G.;IGRASS '99 Proceedings, vol: 1, Jun. 28–Jul. 2, 1999 pp. 230–233.*

"The delay/Doppler radar altimeter",Raney, R.K.;Geoscience and Remote Sensing, IEEE Transactions on, vol.; 36, Issue 5, Sep. 1998 pp.: 1578–1588.*

* cited by examiner

Primary Examiner—John B. Sotomayor
(74) Attorney, Agent, or Firm—Matthew Luxton, Esq.; Armstrong Teasdale LLP

(57) ABSTRACT

A method for simulating a Doppler signal under stationary conditions is described. The method includes sampling a radar return signal at an integer multiple of the return signal frequency plus a fraction of the return signal period and generating a base band signal from the samples.

15 Claims, 3 Drawing Sheets

METHODS AND APPARATUS TO COMPENSATE FOR ZERO DOPPLER RETURNS

BACKGROUND OF THE INVENTION

This invention relates generally to sampling techniques to determine Doppler frequencies, and more specifically to a radar altimeter which incorporates sampling techniques that overcome zero Doppler returns.

Known pulse Doppler radar altimeters process the received radar returns at a base band frequency to minimize the amount of data processed and to minimize processing speeds required to accurately process the radar returns. In such radar altimeters, only a Doppler shifted frequency remains after the radar return signal is converted to a base band frequency. However, under stationary conditions, for example, an aircraft parked on a runway, there is zero Doppler frequency shift. A zero Doppler frequency shift results in a DC level signal being provided to the base band processing circuits. The result is that the base band processing circuits provide no data that can be utilized to determine an altitude.

It is desirable that a radar altimeter operate properly with the aircraft stationary on the ground to allow preflight testing and calibration. Other attempts have been made to rectify the zero Doppler frequency shift problem. One known solution to the zero Doppler frequency shift problem includes mixing an output of a RF mixer local oscillator with a signal source whose signal output is approximately equal to the frequency of a Doppler shift that is typically encountered during a flight. However, this solution requires that additional RF circuitry be added to the radar altimeter, which adds significant expense to the radar altimeter.

BRIEF SUMMARY OF THE INVENTION

In one aspect, a method for simulating a Doppler signal under stationary conditions is provided. The method comprises sampling a radar return signal at an integer multiple of the return signal frequency plus a fraction of the return signal period and generating a base band signal from the samples.

In another aspect, a radar altimeter is provided. The radar altimeter comprises a memory, a sequencer for modulating a first signal, a transmitter coupled to the sequencer for transmitting a radar signal including the modulated first signal toward the ground, and a receiver for receiving a reflected radar signal from the ground, the received radar signal including the modulated first signal The altimeter also comprises a digitizer coupled to the receiver for generating digital samples of the modulated first signal at an intermediate frequency (IF), the IF digital samples being stored in the memory and a processor coupled to the memory which samples the stored IF digital samples at an integer multiple of the period of the stored IF digital samples plus a fraction of the period of the stored IF digital samples.

In still another aspect, a decimation frequency logic unit for a radar altimeter is provided. The unit is configured to provide a sampling rate to an external device receiving an IF signal, the sampling rate at a frequency whose period is at an integer multiple of the period of IF signal plus a selected fraction of the period of the IF signal.

DETAILED DESCRIPTION OF THE INVENTION

Figure 1:
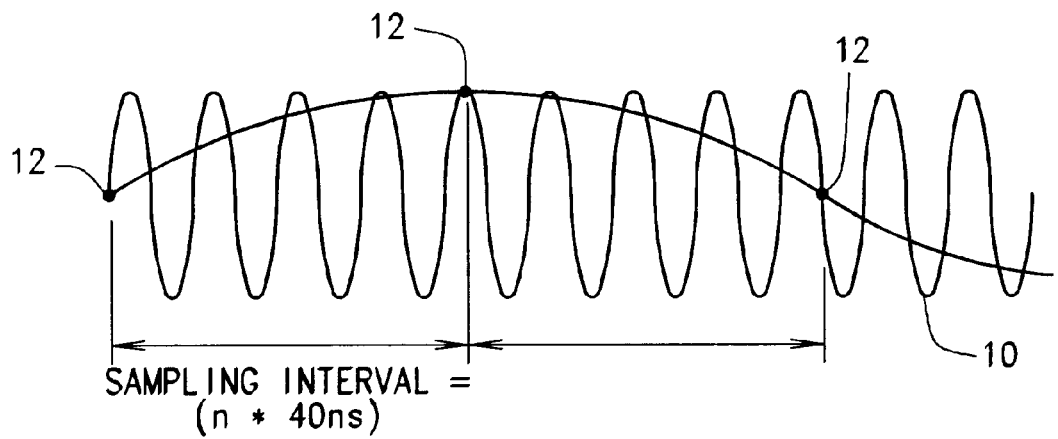
FIG. 1 illustrates a down conversion to a base band frequency from an intermediate frequency (IF) through sampling.

FIG. 1 illustrates a down conversion to a base band frequency from an intermediate frequency (IF). Such a down conversion is part of a processing sequence for a radar return signal received by a radar altimeter, and is sometimes referred to as decimation to a base band frequency. For example, in known radar altimeters, down conversion to base band frequency is normally accomplished in a processor by sampling a return signal 10 at a period of length that is an integer multiple of the period of return signal 10. In some altimeters, the base band frequency is referred to as a Doppler frequency, as the base band frequency is the result of a Doppler shift in the IF.

As shown in FIG. 1, return signal 10 has a period of slightly less than 40 nanoseconds, or is at a frequency of 25 MHz plus the base band (Doppler) frequency. A radar altimeter which utilizes an IF frequency of 25 MHz could, for example, be sampled at 5 MHz, or 25 kHz, or 10 kHz, etc. Therefore, a sampling interval for return signal 10 is stated mathematically as n×40 nanoseconds, where n is an integer. As also shown in FIG. 1, return signal 10 is sampled about every four cycles of return signal 10. The sampling rate, shown by sample points 12 is therefore at an integer multiple of about 4×40 nanoseconds, or every 160 nanoseconds, which is a rate of 6.25 MHz. In FIG. 1, the 6.25 MHz sampling rate is utilized for ease of illustration. Other sampling rates could be used, for example, a sampling rate of 25 kHz, which is a sample once every 1000 cycles of the IF frequency of 25 MHz. As is known, lower sampling frequencies results in less signal processing, but the sampling frequency should be at least two times the highest expected Doppler frequency, to prevent aliasing.

Return signal 10 includes a Doppler shift of, for example, about 1000 Hz such that the frequency of return signal 10 is about 25.001 MHz. Sometimes an intermediate frequency added to a Doppler frequency is referred to as a shifted IF. The Doppler shift causes return signal 10 to be sampled at slightly different points of the individual cycles that make up return signal 10. Samples 12 at the slightly different points of return signal 10 are utilized to generate a signal at the frequency of the Doppler shift. Such a signal is referred to as a base band signal 14, which is at the Doppler frequency, which is then processed by a radar altimeter to determine, for example, a change in amplitude of an aircraft.

Figure 2:
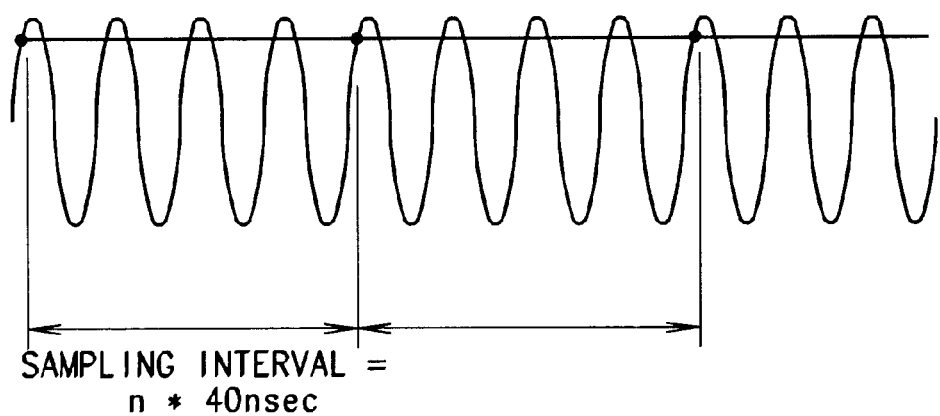
FIG. 2 illustrates the sampling of the IF signal of FIG. 1 above, where there is no Doppler shift in the IF signal.

FIG. 2 illustrates the sampling of FIG. 1 above, with no Doppler shift in return signal 20. As signal 20 includes no Doppler shift of the IF frequency, the frequency of signal 20 is constant at the intermediate frequency of 25 MHz. As with signal 10 (shown in FIG. 1), signal 20 is sampled at a 6.25 MHz rate, or once every 160 nanoseconds. However, since signal 20 is 25 MHz, and 160 nanoseconds is an integer multiple of the period (40 nanoseconds) of signal 20, sampling points 22 occur at about the same location within individual cycles of return signal 20. A signal 24 that is generated from such samples is therefore a DC signal, which cannot be processed by known radar altimeter processors, as no base band frequency results. As described above, signal 24 is sometimes referred to as a zero return signal. One example of where a zero return signal is received at a processor of a radar altimeter, is when the radar altimeter is stationary, for example, an aircraft parked on a runway. However, zero return signals make it difficult to perform preflight testing and calibration procedures.

Figure 3:
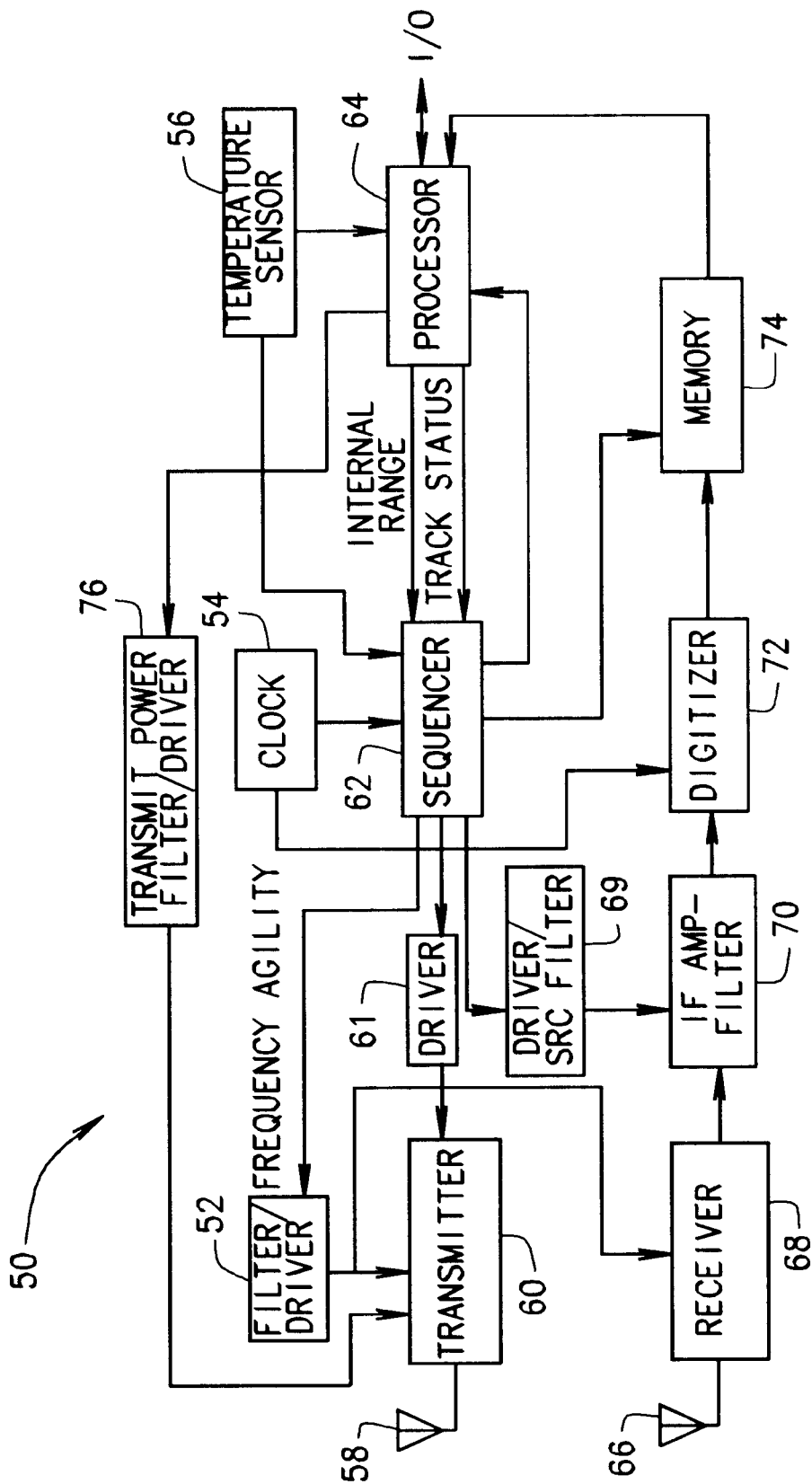
FIG. 3 is a block diagram of a radar altimeter.

FIG. 3 is a block diagram of a radar altimeter 50, which compensates for the zero return signal problem described above. In one embodiment, radar altimeter 50 is incorporated in an air vehicle. Radar altimeter 50 includes filter/driver 52, clock 54, temperature sensor 56, transmit antenna 58, transmitter 60, driver 61, sequencer 62, processor 64, receive antenna 66, receiver 68, driver/sensitivity range control (SRC) filter 69, intermediate frequency (IF) amplifier-filter 70, digitizer 72, memory 74 and transmit power filter/driver 76.

Transmitter 60 transmits pulses of RF energy towards the ground through antenna 58. The RF energy is modulated with a pulse compression Bi-phase coded format produced by sequencer 62 resulting in modulated radar signals. The output power of transmitter 20 is controlled in a closed loop fashion by processor 64, which is coupled to transmit power filter/driver 76. The output power of transmitter 60 is minimized by processor 64 for a low probability of detection.

Antenna 66 receives the modulated radar signals reflected from the ground. The received signals are amplified and mixed down to IF by receiver 68, and further amplified and band limited by IF amplifier-filter 70. Digitizer 72 digitizes the received signal, as described above with respect to FIGS. 1 and 2, and outputs the digitized samples to memory 74.

Sequencer 62 selects ground return samples corresponding to a present altitude delay (as determined by processor 64 and communicated to sequencer 62 on an internal range line) and shifts the selected samples from memory 74 to processor 64. Processor 64 then determines if the next set of samples should be taken closer in or further out in range, and generates a new internal range command. The result is a closed-loop altitude tracking servo, such that as the altitude changes, processor 64 generates a measure of range tracking error which is used to change the internal range command fed back to sequencer 62. Processor 64 generates an output altitude from the internal range. In one embodiment, processor 64 includes decimation frequency logic, which is utilized in down sampling the IF frequency, which may include a Doppler shift, to a base band frequency.

Figure 4:
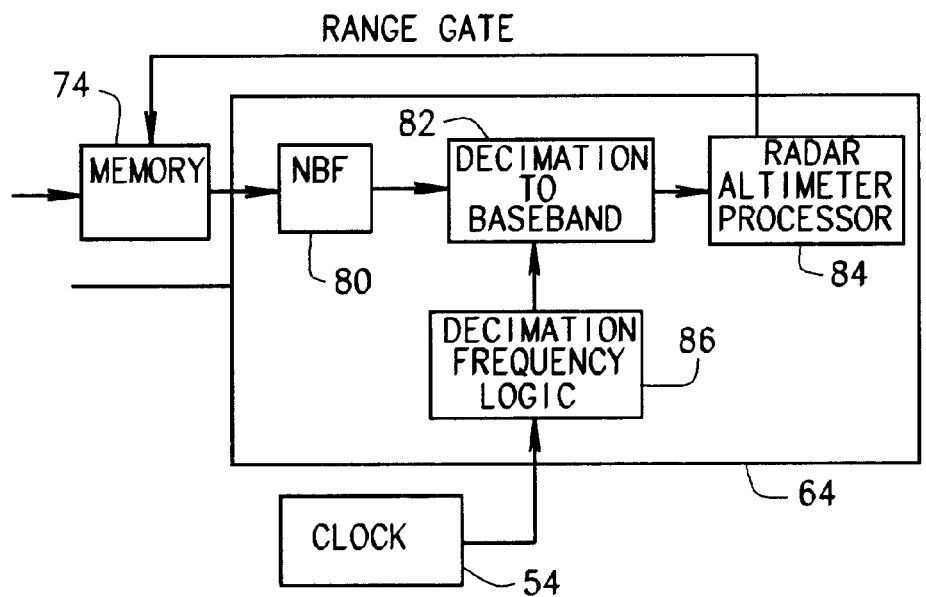
FIG. 4 is a block diagram of a processing portion, including decimation frequency logic, of the radar altimeter of FIG. 3.

FIG. 4 is a partial block diagram of processor 64. As described above, processor 64 receives selected samples of the digitized IF frequency from memory 74, and further receives a clock signal. Processor 64 includes a narrow band filter 80, a decimation to base band function 82, a radar altimeter processing function 84, and decimation frequency logic 86. As samples are received from memory 74, narrow band filter 80 removes noise from the samples, which are passed to decimation to base band function 82. Decimation to base band function 82 receives a decimation period from decimation frequency logic 86, providing a base band signal which compensates for possible zero Doppler returns, to allow altitude processing by radar altimeter processing function 84. To compensate for possible zero Doppler returns, decimation frequency logic 86 causes decimation to base band function 82 to sample the IF digital samples received from narrow band filter 80 at a frequency whose period is at an integer multiple of the period of the intermediate frequency plus a selected fraction of the period of the intermediate frequency.

Operation of decimation frequency logic 86 is further illustrated by an example. If the highest expected Doppler frequency is about 12 kHz, a 25 kHz sampling frequency for decimation to base band could be utilized, which would prevent aliasing. For an IF frequency of 25 MHz, with a period of 40 nanoseconds, there are four 10 nanosecond samples per cycle. For a sampling frequency of 25 kHz, with a period of 40,000 nanoseconds, there are 4,000 10 nanosecond samples per cycle. However, decimation frequency logic 86 causes the sampling rate to be changed, in one illustrative example, by adding an extra 10 nanosecond delay in between samples of the IF frequency. Adding an extra 10 nanosecond delay changes the decimation period to 40010 nanoseconds (about 24,993 Hz), or one sample for slightly more than every 4000 periods of the IF frequency. Decimation frequency logic 86, in one embodiment, is programmable such that other fractions of the period of the IF signal can be utilized, for example, adding a 30 nanosecond delay in between samples of the IF frequency, for a sampling rate of about 24,981 Hz.

Other embodiments exist by way of reducing the delay in between samples of the intermediate frequency. Such embodiments are referred to herein as adding a negative fraction of the return signal period to the integer multiple of the return signal frequency. For example, rather than sampling at 24,993 Hz as described above, reducing the decimation period to 39990 nanoseconds, resulting in a sampling frequency of about 25,006 Hz, will provide similar results. Other fractional reductions in the sampling period will also result in a signal being generated from the samples, for example, reducing the decimation period to 39970 nanoseconds, resulting in a sampling frequency of about 25,018 Hz.

By adjusting the sampling rate through decimation frequency logic 86, radar altimeter 50 (shown in FIG. 3) is able to compensate for zero Doppler returns, as the adjusted sampling rate results in a non-zero base band frequency being provided to radar altimeter processing function 84, which then determines an altitude of the vehicle in which radar altimeter 50 is installed through utilization of known altitude processing techniques. For the processing of samples of IF frequencies which include a Doppler shift, in addition to the changed decimation period, radar altimeter processor 84 is configured to subtract the frequency resulting from the changed decimation period such that the actual Doppler frequency is utilized in determining an altitude of a vehicle incorporating radar altimeter 50.

Figure 5:
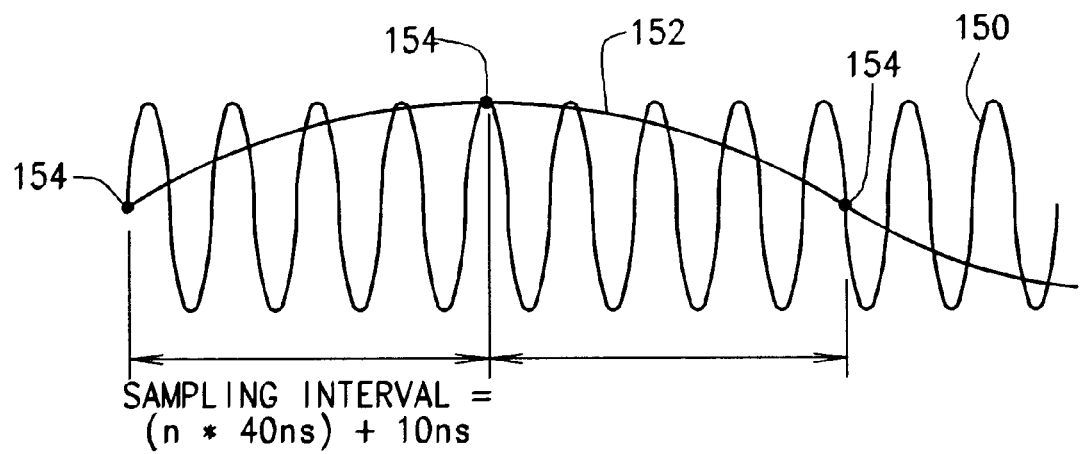
FIG. 5 illustrates generation of a base band signal under zero Doppler conditions, based on the decimation frequency logic of FIG. 4.

FIG. 5 illustrates a down conversion to a base band frequency from an intermediate frequency (IF) signal 150 in, for example, radar altimeter 50 (shown in FIG. 3) for a zero Doppler condition. As described above, radar altimeter 50 incorporates processor 64 (shown in FIG. 4). As described above with respect to processor 64, and more particularly to decimation frequency logic 86 (shown in FIG. 4), a base band signal 152 is generated under zero Doppler conditions by sampling IF signal 150 at a frequency whose period is an integer multiple of the period of IF signal 150 plus a carefully chosen fraction of the period of IF signal 150. A base band frequency (e.g. signal 152) which results is offset from a frequency of an actual Doppler offset.

Operation of decimation frequency logic 86 is further illustrated in the following example. The fractional period of IF signal 150 chosen plus the integer multiple of IF signal 150 results in a 2.9 kHz base band signal 152. Therefore, under zero Doppler conditions, the samples 154 which constitute base band signal 152, cause signal 152 to be at a frequency of 2.9 kHz. When a Doppler shift of, for example, 1000 Hz is encountered, the samples 154 that constitute base band signal 152 result in a 3.9 kHz signal. As described with respect to radar altimeter 50 and decimation frequency logic 86 above, providing an offset to the sampling frequency of IF signal 150, resulting in a non-zero base band frequency, of signal 152 under zero Doppler conditions, provides a capability to operate radar altimeter 50 with an aircraft stationary on the ground.

Capabilities which allow operation of a radar altimeter while stationary, provides a simplicity to preflight testing and calibration procedures that have not been previously attained. The above described improvements over known zero Doppler compensation techniques allows radar altimeter 50 to provide these capabilities without addition of costly and complex RF circuitry, as is the case in known zero Doppler compensation techniques.

While the invention has been described in terms of various specific embodiments, those skilled in the art will recognize that the invention can be practiced with modification within the spirit and scope of the claims.

What is claimed is:

1. A method for simulating a Doppler signal under stationary conditions, in a radar altimeter, said method comprising:

sampling a radar return signal at an integer multiple of the return signal frequency plus a fraction of the return signal period; and generating a base band signal from the samples.

2. A method according to claim 1 wherein sampling a radar return signal comprises:

down sampling a radar return signal to an intermediate frequency (IF) signal; and sampling the IF signal at an integer multiple of a period of the IF signal plus a fraction of the IF signal period.

3. A method according to claim 2 wherein sampling the IF signal comprises:

receiving a decimation period that is an integer multiple of a period of the IF signal plus a fraction of the IF signal period;

sampling the IF signal at the decimation period; and providing a base band signal from the IF signal samples.

4. A method according to claim 1 wherein the fraction of the return signal period is a negative fraction of the return signal period.

5. A method according to claim 2 wherein the radar altimeter includes a processor receiving an IF signal, the processor including a decimation to base band function, decimation frequency logic, and a radar altimeter processing function, said method comprising:

determining a decimation period in the decimation frequency logic that is an integer multiple of a period of the IF signal plus a fraction of the IF signal period;

providing the decimation period to the decimation to base band function;

sampling the IF signal at the decimation period with the decimation to base band function; and providing a base band signal from the decimation to base band function to the radar altimeter processing function based on the IF signal-samples.

6. A radar altimeter comprising:

a memory;

a sequencer for modulating a first signal;

a transmitter coupled to said sequencer for transmitting a radar signal including the modulated first signal toward the ground;

a receiver for receiving a reflected radar signal from the ground, the received radar signal including the modulated first signal;

a digitizer coupled to said receiver for generating digital samples of the modulated first signal at an intermediate frequency (IF), the IF digital samples being stored in said memory; and a processor coupled to said memory, said processor sampling the stored IF digital samples at an integer multiple of the period of the stored IF digital samples plus a fraction of a period of the stored IF digital samples.

7. A radar altimeter according to claim 6 wherein said processor comprises:

a narrow band filter receiving the IF digital samples stored in said memory;

a decimation to base band function receiving the filtered IF digital samples from said narrow band filter;

decimation frequency logic causing said decimation to base band function to sample the IF digital samples received from said narrow band filter at a frequency whose period is at an integer multiple of the period of the IF signal plus a selected fraction of the period of the IF signal; and a radar altimeter processor to determine an altitude based on a base band signal received from said decimation to base band function, the base band signal being the samples taken by said decimation to base band function.

8. A radar altimeter according to claim 7 wherein the selected fraction of the period of the IF signal is programmable in said decimation frequency logic.

9. A radar altimeter according to claim 7 wherein the integer multiple of the period of the IF signal is programmable in said decimation frequency logic.

10. A radar altimeter according to claim 6 wherein the fraction of the period of the stored IF digital samples is a negative fraction of the period of the stored IF digital samples.

11. A decimation frequency logic unit for a radar altimeter, said unit configured to provide a sampling rate to an external device receiving an IF signal, the sampling rate at a frequency whose period is at an integer multiple of the period of IF signal plus a selected fraction of the period of the IF signal.

12. A decimation frequency logic unit according to claim 11 wherein the selected fraction of the period of the IF signal is programmable.

13. A decimation frequency logic unit according to claim 12 wherein the selected fraction of the period of the IF signal is negative.

14. A decimation frequency logic unit according to 11 wherein the integer multiple of the period of IF signal is programmable.

15. A method for sampling a signal to avoid a zero return, said method comprising sampling the signal at an integer multiple of a period of the signal plus a fraction of the signal period.

* * * * *